Patented Jan. 2, 1945

2,366,204

UNITED STATES PATENT OFFICE 2,366,204

KETO-STEROIDS AND METHOD OF OBTAINING SAME

Russell Earl Marker, State College, Pa., and Elmer J. Lawson, Detroit, Mich., assignors to Parke, Davis & Company, Detroit, Mich., a corporation of Michigan No Drawing. Application January 4, 1941, Serial No. 373,192

20 Claims. (Cl. 260—397.4)

This invention relates to steroids and particularly, to new hydroxy-ketones of the steroid series and methods of making the same.

An object of this invention is the preparation of cyclopentanoperhydrophenanthrene derivatives having a carbonyl oxygen atom at carbon atom 3, and a hydroxyl or ester group at carbon atom number 6.

A further object of this invention is the conversion of such hydroxy-ketones or their esters into unsaturated ketones valuable as therapeutic agents or intermediates for the same.

Other objects will be apparent from a perusal of this disclosure.

We have found that a distinct difference exists in the reactivity of hydroxyl, ester, or ether groupings at carbon atoms 3 and 6 of the steroid molecule, in that the hydroxyl, ester, ether, or like grouping at carbon atom 3 is more reactive than a similar grouping at carbon atom 6, and consequently chemical change can be effected on the more reactive grouping at carbon atom 3, while leaving the grouping at carbon atom 6 substantially intact and unaffected. Thus, we prepare a 3-hydroxy-6-esterified steroid, then oxidize it to a 3-keto-6-esterified steroid and hydrolyze this to a 3-keto-6-hydroxy steroid. Either the 3-keto-6-hydroxy- or 3-keto-6-esterified steroids, we find, on heating with or without acidic dehydrating agents, are smoothly transformed into 3-keto-$\Delta^4$-unsaturated steroids. This discovery is new and surprising and makes available hitherto inaccessible steroid intermediates useful in the preparation of therapeutically useful substances.

Suitable starting materials for the practice of our invention may be steroids or related compounds of the type A, or B

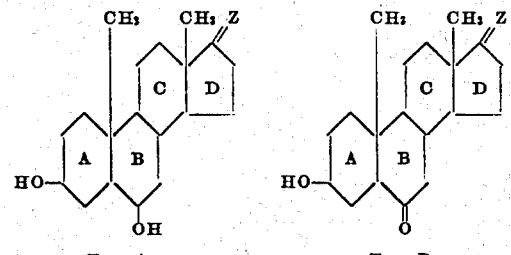

Type A      Type B where Z is a member of the class consisting of

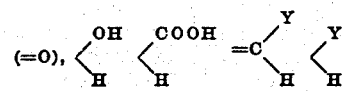

and groups hydrolyzable to these, Y being selected from the class consisting of (a) Saturated hydrocarbon radicals,
(b) Unsaturated hydrocarbon radicals,
(c) Saturated hydrocarbon radicals substituted by a member of the class consisting of carbonyl, hydroxyl, carboxyl, and groups hydrolyzable to these, and
(d) Unsaturated hydrocarbon radicals substituted by a member of the class consisting of carbonyl, hydroxyl, carboxyl and groups hydrolyzable to these.

Materials of type A on which this invention may be practiced include the various isomers, with regard to carbon atoms 3, 5, and 6, of hyodesoxycholic acid; cholestanediol-3,6-diol-3,6; pregnanone-20-diol-3,6; 17 - isopropylidene - anrostanediol-3,6; 17-ethyl-, 17-ethenyl-, or 17-ethynyl-androstanediol-3,6; 3,6,17 - trihydroxyetio-cholanic acid; and the like.

Similarly, steroids of type B on which the invention may be practiced include the isomers with regard to carbon atoms 3 and 5 of 3-hydroxy-6-ketocholanic acid; cholestanol-3-one-6; androstanone-6-diol - 3,17; pregnanedione-6,20-ol-3; and the like.

Furthermore, for the operation of this invention, it is not essential that the configurations of the hydroxyl groups at carbon atoms 3 and 6, or of the hydrogen atom at carbon atom 5 have any particular orientation, for, as the examples to follow will show, there may be used hydodesoxycholic acid, in which the configuration as far as known is like epi-coprostanol, or there may be used either of the cholestanediols-3($\beta$),6, which are believed to be epimeric at carbon atom 6. We do not mean, however, to imply that there is no quantitative difference in the behavior of the isomeric 3,6-dihydroxy-steroids, but merely that these differences are only matters of degree and not of kind.

The practice of our invention is restricted, however, to those 3,6-dihydroxy- or 3-hydroxy-6-keto-steroids which are saturated in rings A and B and contain no other substituents attached to rings A and B.

In practicing our invention we proceed as follows:

If the starting material is a 3,6-dihydroxy-steroid of type A (I), illustrated below, it may be treated in the first step of our invention in any of several ways.

Thus the 3,6-dihydroxysteroid (I) is treated with a quantity (two moles or more) of an esterifying agent sufficient to convert both hydroxyl groups to the corresponding ester derivative.

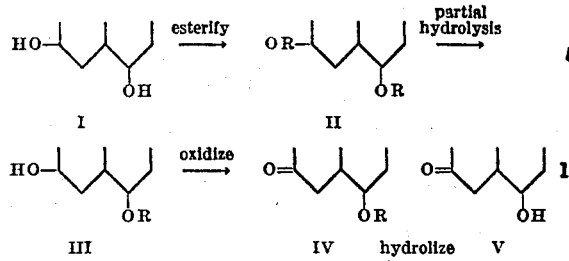

OR=an acid radical.

This substance (II) is then subjected to a partial saponification procedure whereby the steroid is reacted with a saponifying agent insufficient in amount and/or strength to rupture the ester linkages attached to both carbon atoms 3 and 6, and therefore, in accordance with our discovery, ruptures only, or mainly the ester linkage attached to carbon atom 3, leaving the ester linkage attached to carbon atom 6 largely unaffected. The hydroxyl group attached to carbon atom 3 in the resulting half-ester (III) is oxidized under relatively mild oxidizing conditions to a carbonyl group, without affecting the ester linkage to carbon atom 6, by treatment with an oxidizing agent capable of converting a secondary hydroxyl into a carbonyl group. The keto-ester (IV) thus formed may then be saponified to yield a hydroxyketone (V) of the type made available by our invention.

Again, the 3,6-dihydroxy steroid (I) may be treated, in the practice of our invention, by a somewhat different procedure, in that it is first subjected to a partial esterification or partial etherification process which has the effect of mainly esterifying or etherifying the hydroxyl group at carbon atom 3, yet leaving the hydroxyl group at carbon atom 6 substantially unaffected. This process is achieved by treating the 3,6-dihydroxy-steroid with an amount of an esterifying or etherifying agent insufficient in amount and/or strength to attack both the 3- and 6-hydroxyl groups.

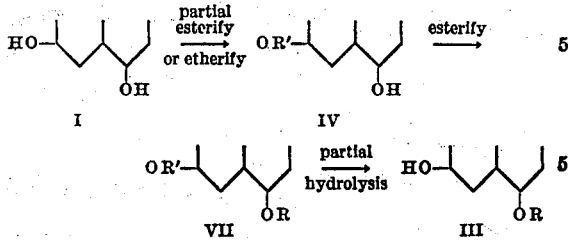

OR=an acid radical.
OR'=OR, or an ether radical.

This partial-ester or -ether (VI) is then treated further with an esterifying agent in order to completely esterify the hydroxyl group at carbon atom 6 of the partial-ester or -ether. The latter step may be conducted so that the hydroxyl groups at carbon atoms 3 and 6 are protected by the same group OR, but we prefer to further esterify so as to prepare a so-called mixed ester or ester-ether (VII), in which the group at carbon atom 3 is of a more labile character and therefore more readily saponifiable than the group at carbon atom 6. For example, when the ester group at carbon atom 3 is derived from a stronger acid than the group linked to carbon atom 6, then it is certain that the group at $C_3$ will be hydrolyzed first. This mixed ester, or ester-ether (VII) is then subjected, as already described for the case of the simple 3,6-di-esterified steroid (II), to the procedures of partial hydrolysis, oxidation, and hydrolysis outlined in the previous paragraph.

If there is chosen, as the starting material for the practice of our invention, a 3-hydroxy-6-keto-steroid of the type (B) (VIII), it may be reduced by catalytic hydrogenation or the action of nascent hydrogen, or by similar methods, to the corresponding 3,6-dihydroxysteroid (I), and this treated in accordance with the directions of the foregoing paragraphs with reference to type (A). A preferable procedure, however, is first to subject the 3-hydroxy-6-keto-steroid to an esterifying or etherifying process, preferably thus introducing a rather labile group at carbon atom 3 before reducing the 6-keto group to hydroxyl.

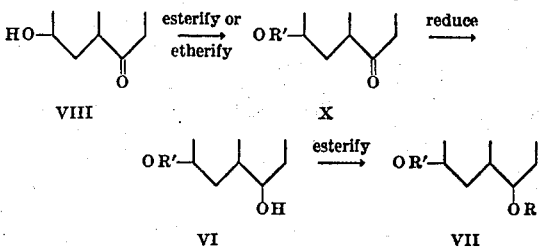

OR=an acid radical.
OR'=OR or a hydrocarbon radical.

The 3-esterified or 3-etherified-6-keto-steroid (IX), is then reduced so as to convert the carbonyl oxygen group at carbon atom 6 to a hydroxyl group. This 3-esterified-(or-etherified-) 6-hydroxy-steroid (VI) is then further esterified (VII) and then treated as already described for type A.

The 3-keto-6-hydroxy-steroids (V) or their esters (IV) as thus prepared are converted into 3-keto-$\Delta^4$-unsaturated ketones (X) by subjecting them to heat and/or acidic dehydration treatments.

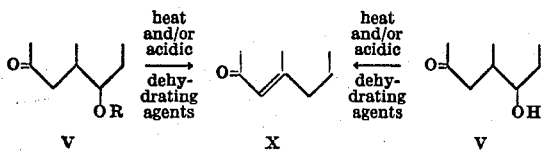

The following examples serve to illustrate our invention.

*Example 1*

(a) A mixture of four grams of cholestanediol-3, 6, M. P. 216°, prepared by the method of Windaus, Ber. 50, 133 (1917), 3 g. of triphenylmethyl chloride, and 20 cc. of dry pyridine are allowed to stand at room temperature. After several days a solution of 1.5 cc. of benzoyl chloride in 10 cc. of dry pyridine is added and the mixture again set aside. The next day the solution of 3-trityloxy-6-benzoxy-cholestane in pyridine is poured into water and the precipitate collected and washed with water and dried. It is then warmed for fifteen minutes with 100 cc. of 5% sulfuric acid in acetic acid, cooled, and a solution of 1 g. of chromic anhydride in 10 cc. of 90% acetic acid added, and the mixture allowed to stand for an hour at room temperature. Then the mixture is poured into water, ether extracted, and the ethereal extract washed with sodium hydroxide to remove acidic substances. The ethereal solution is evaporated to dryness, and the residue fractionally crystallized from methanol giving cholestanone-3-ol-6-benzoate, M. P. 187°.

(b) One gram of cholestanone-3-ol-6-benzoate, M. P. 187°, prepared as described above, is slowly distilled in a high vacuum (bath temperature, 190°). The distillate is crystallized from methanol and yields cholestenone, M. P. 82°.

Example 2

(a) To a solution of 25 g. 6-ketocholestanol-3(β), M. P. 143°, in 300 cc. of methanol is added 1.0 g. of platinum oxide catalyst, and the mixture shaken under 3 atmospheres of hydrogen for forty-five minutes during which the diol partially separates out of solution. The mixture of catalyst and precipitated diol is collected on a Buchner funnel, and the diol leached out with warm alcohol and added to the filtrate. This combined alcoholic solution is concentrated, and on cooling, deposits a crop of crystals, which after recrystallization weigh 20 g. and have M. P. 190°. This cholestanediol-3,6, hitherto unknown, depresses the melting point of the cholestanediol-3,6, M. P. 216°, of Windaus (loc. cit.), and is believed to be epimeric with it in regard to carbon atom 6.

(b) The diacetate, M. P. 138°, of this cholestanediol-3,6 is obtained by refluxing the diol with an excess of acetic anhydride and recrystallizing the product from methanol. It is believed that this diacetate differs from the diacetate, M. P. 107°, of Windaus (loc. cit.) in regard to configuration at carbon atom 6.

(c) To 5 g. of cholestanediol-3,6 diacetate, M. P. 138°, in 1500 cc. of methanol at 18° is added 0.46 g. (0.8 mole) of potassium hydroxide in 94 cc. of methanol. The solution is kept at 18-22° for forty-eight hours, then exactly neutralized with 0.5 molar sulfuric acid, and evaporated to dryness in vacuo. Traces of methanol are removed by adding acetic acid and again evaporating to dryness. The oily residue is dissolved in 125 cc. of acetic acid, and 0.6 g. of chromic oxide in 25 cc. of 90% acetic acid is added to the solution. After standing for three hours the mixture is poured into water and then the supernatant liquor decanted from the semisolid residue. This is crystallized from alcohol, methanol and petroleum ether, giving 2 g. of needles, M. P. 101°, of cholestanone-3-ol-6 acetate. The oxime, prepared in the known manner, has M. P. 170°.

(d) The solution of 3.7 g. of cholestanone-3-ol-6 acetate, M. P. 101°, in 150 cc. of 2% methanolic potassium hydroxide is refluxed for ninety minutes, and then cooled and diluted with water. The next day the crystals are collected, washed with water, and recrystallized from methanol to yield leaflets, M. P. 190°, of cholestanone-3-ol-6.

(e) One hundred miligrams of cholestanone-3-ol-6, M. P. 190°, and 5 g. of fused potassium bisulfate are pulverized together and heated for two hours at 125°, then five hours at 185° in a distillation apparatus under an oil pump vacuum. The sublimate, M. P. 80°, is cholestenone and does not depress the M. P. of a known sample.

Example 3

(a) To 0.9 g. of 3,6-diacetoxypregnanone-20 pregnanediol-3α,6-one-20 diacetate), M. P. 100° (prepared according to the directions of copending application, Serial No. 359,162, of Russell Earl Marker, filed September 30, 1940) in 200 cc. of methanol at 20° is added 42 cc. of methanolic potassium hydroxide containing 0.8 mole of base per mole of ketone. After the solution has stood for forty-eight hours it is exactly neutralized with 1.70 cc. of 0.96 N sulfuric acid, and the solvents completely removed in vacuo. The oily residue is oxidized for one hour at room temperature in 25 cc. of acetic acid with a solution of 5 cc. of 90% acetic acid containing 0.5 g. of chromic oxide. Water is added, the precipitate extracted with ether, and the ethereal extract washed and concentrated to a small volume. Addition of pentane causes the separation of white prisms of 6-acetoxypregnanedione-3,20, M. P. 182°.

(b) The 6-acetoxypregnanedione obtained above is refluxed with 40 cc. of 2% methanolic potassium hydroxide for seventy-five minutes. Water is added and the organic material extracted with ether. The ethereal solution is washed with water and then evaporated to dryness. The solid remaining is covered with 5.0 g. of fused potassium bisulfate, and then heated in an oil pump vacuum at 130° for an hour and a half. The temperature is then gradually raised to 180° for four hours. The distilled substance collected on a cold finger is dissolved in ether. The ethereal solution, on evaporation, leaves a pale mobile oil, which, when seeded with progesterone crystallizes from acetone-water to yield greasy crystals.

Recrystallization from ether-pentane produces little white crystals of progesterone of M. P. 120°, which give no depression in melting point with an authentic sample.

Example 4

(a) A solution of 2 g. of 3(β)-hydroxy-6-ketocholanic acid, M. P. 235°, in 30 cc. of formic acid is concentrated to half volume over a period of two hours, 100 cc. of alcohol and 0.2 g. of platinum oxide added and the mixture shaken in a hydrogen atmosphere under pressure for an hour. After removing the catalyst by filtration, the solution is evaporated to dryness in vacuo, 50 cc. of benzene added, and the solution again evaporated to dryness in vacuo. The residue is dissolved in 10 cc. of pyridine and a solution of 1.2 cc. of benzoyl chloride in 10 cc. of pyridine added. The next day the mixture is poured into water, extracted with ether, and the ethereal extract well shaken out with dilute hydrochloric acid and water, and then evaporated to dryness. The residue is dissolved in 75 cc. of methanol and 2 g. of potassium bicarbonate added, and the mixture refluxed for half an hour. Then the mixture is acidified with acetic acid, diluted with water and thoroughly extracted with ether. The ethereal extract is evaporated to dryness, the residue dissolved in 20 cc. of acetic acid, and a solution of 1 g. of chromic anhydride in 10 cc. of 90% acetic acid added. After an hour the solution is carefully diluted with ice water and the granular solid collected and washed with ice water. It is dried first at room temperature, and then in a vacuum in the temperature of boiling alcohol. This slightly greenish product, 3-keto-6-benzoxycholanic acid may be crystallized from slightly diluted methanol, but it is found to be sufficiently pure for the next step.

(b) One gram of 3-keto-6-benzoxycholanic acid is dissolved in 100 cc. of ether and an excess of ethereal solution of diazomethane added. The solution is allowed to stand overnight, the ether then evaporated, and the crystalline residue distilled in a high vacuum at about 200°. The distillate is dissolved in ether, and the ethereal extract washed with dilute sodium hydroxide and water. After evaporation of the ether, the residue is crystallized from methanol and thus yields methyl $\Delta^4$-3-ketocholenate, M. P. 126°.

Example 5

(a) One gram of androstanone-17-diol-3,6 diacetate prepared by the vigorous chromic acid oxidation of cholestane-diol-3,6 diacetate, M. P. 138°, according to copending application, Serial No. 359,162, of Russel Earl Marker, filed September 30, 1940, is dissolved in 100 cc. of methanol and 6 cc. of 2% methanolic potassium hydroxide added. After standing for two days at room temperature, the solution is exactly neutralized with dilute sulfuric acid, evaporated to dryness, dissolved in 20 cc. of acetic acid, and again evaporated to dryness in vacuo. The residue is dissolved in 20 cc. of acetic acid, and a solution of 200 mg. of chromium trioxide in 5 cc. of 90% acetic acid added. After an hour the excess chromium trioxide is destroyed by the addition of a little methanol, and the solvents removed in vacuo. The residue is boiled with an excess of alcoholic sodium hydroxide, cooled, diluted with water, and ether-extracted. The residue remaining after removal of the ether is crystallized from acetone and gives white crystals of androstanedione-3,17-ol-6. The product is soluble in alcohol and acetone, less soluble in benzene.

(b) One hundred milligrams of the androstanedione-3,17-ol-6 thus obtained is intimately mixed with 2 g. of freshly fused zinc chloride, and slowly distilled in a high vacuum at 190°. The gummy distillate is treated with a few drops of cold ether, causing the separation of crystals. These are collected and recrystallized from acetone, giving $\Delta^4$-androstenedione-3,17, M. P. 170°.

Example 6

(a) One gram of the diacetoxy - lactone, $C_{26}H_{28}O_6$, M. P. 250°, from chlorogenin [Noller, J. Am. Chem. Soc. 60, 1630 (1938)] is dissolved in 250 cc. of methanol, 10 cc. of 10% aqueous sodium bicarbonate solution added, and the mixture refluxed for an hour and a half. The mixture is then exactly neutralized with sulfuric acid, evaporated to dryness in vacuo, dissolved in 100 cc. of acetic acid, and oxidized with 0.3 g. of chromic anhydride in 10 cc. of 90% acetic acid. After an hour, any excess oxidizing agent is destroyed with sulfur dioxide, and the solution concentrated in vacuo to a sirup. This is boiled for an hour with 30 cc. of 5% methanolic KOH, then the solution is acidified and the product precipitated with water.

(b) The product obtained above is mixed with 5 g. of anhydrous copper sulfate and slowly distilled in a high vacuum at 200°. The sublimate is washed with a small amount of cold, slightly diluted methanol onto a Buchner funnel and shows a M. P. of 213°. It is believed to be the lactone of 16-hydroxy-3-keto-$\Delta^4$-bisnor-cholenic acid.

Example 7

(a) 6-nitrositosteryl nitrate is prepared and reduced with zinc dust and acetic acid by a method similar to that described in J. Chem. Soc. 1938, 102. The hydrolyzed product, sitostanol-3($\beta$)-one-6 is crystallized from alcohol and has M. P. 138–140°.

(b) This sitostanol-3($\beta$)-one-6 is catalytically hydrogenated as described in Example 2. The product, sitostanediol-3($\beta$), 6, is crystallized from alcohol and then has M. P. 203–5°.

(c) Sitostanediol-3($\beta$), 6, on refluxing with an excess of acetic anhydride, removal of the latter in vacuo, and crystallization of the residue from methanol, gives sitostanediol-3($\beta$), 6 diacetate, M. P. 104–6°.

(d) The diacetate (3 g.) so obtained is refluxed in methanol solution containing 30 cc. of 10% aqueous sodium bicarbonate solution for one and a half hours, cooled, poured into water, extracted with ether, and the ether evaporated. The residue is oxidized using 1 g. of chromic anhydride and then worked up as in the previous examples. Thus there is obtained sitostanol-6-one-3, which, after crystallization from methanol, has M. P. 190–2°.

(e) Sitostanol-6-one-3 is heated with p-toluene-sulfonic acid and then slowly sublimed in a high vacum. The sublimate, after crystallization from acetone, melts at 83° and is shown to be sitostenone by comparison with an authentic sample.

Example 8

(a) $\Delta^{22}$-stigmastenedione-3,6 is prepared according to the method of Fernholz, Ann. 508, 215 (1934). This is reduced with sodium and alcohol by a method similar to that of Windaus, Ber. 50, 133 (1917) to $\Delta^{22}$-stigmastenediol-3,6.

(b) Two grams of $\Delta^{22}$-stigmastenediol-3,6 are acetylated by refluxing with an excess of acetic anhydride, and then the latter removed in vacuo. The residue is crystallized from methanol and yields $\Delta^{22}$-stigmastenediol-3,6 diacetate. This is refluxed in methanol solution with 2 g. of potassium bicarbonate solution for an hour and a half, cooled, diluted with water, and ether extracted. The ether is removed on a steam bath, and the residue refluxed for eight hours with 100 cc. of acetone and 2 g. of aluminum ter-butylate. Then an excess of dilute alkali is added, and the mixture refluxed for one hour, cooled, and ether extracted. After washing with water, the ethereal extract is evaporated, and the residue crystallized from methanol to give $\Delta^{22}$-stigmastenol-6-one-3.

(c) A hundred milligrams of $\Delta^{22}$-stigmastenol-6-one-3 are mixed with a gram of fused zinc chloride and very slowly sublimed in a high vacuum. The sublimate, stigmastadienone is identical with an authentic sample. It melts at 94°, or 127°, depending on the solvent used for crystallization.

The foregoing examples are capable of numerous variations with regard to starting materials, reagents, and conditions, as indicated below.

As suitable starting materials there may be used any ring —A— and ring —B— saturated 3,6-dioxygenated steroid of the type already described.

In the step (I→II) there may be used, besides acetic anhydride, other acylating agents derived from organic or inorganic acids such as p-toluenesulfonyl chloride, ketene, propionic anhydride, formic acid, carbamyl chloride, phthalic anhydride, benzoyl chloride, furoyl chloride, stearoyl chloride, and the like. The reaction may sometimes be carried out by simple admixture of the reactants, but usually it is preferable to use a solvent such as an excess of the acylating agent, or its related acid, or a tertiary base such as pyridine, or an inert solvent like chloroform or benzene.

The partial hydrolysis (II→III, or VII→III)

may be conducted using instead of potassium hydroxide or potassium bicarbonate, other basic reagents such as sodium hydroxide, barium hydroxide, sodium carbonate, ammonium hydroxide, or the like, and there may be used as solvents other media than methanol, such as water, acetone, dioxane, alcohol, the monomethyl ether of ethylene glycol, benzene, or mixtures thereof. Instead of an alkaline hydrolytic agent there may also be employed an acidic hydrolytic reagent such as p-toluenesulfonic acid, sulfuric acid or hydrochloric acid. The essential feature of this step is the use of hydrolytic agents and/or conditions sufficiently mild so that only partial hydrolysis occurs, whereupon, as we have found, there is produced the 3-hydroxy-6-esterified steroid Likewise, the essential feature of the partial esterification or etherification (I→VI) is the use of reagents and/or conditions so mild that only partial esterification or etherification occurs, yielding, as we have discovered, the 3-esterified-or-etherified-6-hydroxy-steroids. Instead of triphenylmethyl chloride and pyridine there may be used other reagents and solvents such as other etherifying agents or the acylating agents mentioned for the step I→II.

The methods of conducting steps VIII→IX, IX→VI, VI→VII, and IV→V are susceptible to variations which in view of what has already been shown will be understandable to those skilled in the art. Thus instead of acylating with formic acid and then catalytically hydrogenating, as in Example 4, the steroid (VIII) may, for example, be tritylated as in Example 1, the carbonyl group of (IX) reduced with sodium and alcohol, and the esterification accomplished by methods already discussed, avoiding acidic media because of the readiness with which the trityl group is removed by acids. The oxidation of III is preferably accomplished by the use of chromic acid in acetic acid solution, but other reagents such as the combination of acetone and aluminum ter-butylate may also be employed. The use of the latter is especially advisable if double bonds are present in the side chain attached to C—17, as in Example 8, for here chromic acid or similar vigorous oxidizing agents tend to attack the double bond. However, such vigorous reagents may be employed if the double bond is intermediately protected by the addition of bromine prior to oxidation. The bromine may be removed after the oxidation by heating with zinc and acetic acid according to known methods. While the hydrolysis of the resulting ester (IV) ordinarily is satisfactorily accomplished by the use of basic reagents like potassium hydroxide or barium hydroxide, in some instances it is preferable to hydrolyze in the presence of acids like p-toluenesulfonic acid or hydrochloric acid.

The step (IV→X, or V→X) of preparation of the 3-keto Δ⁴-unsaturated steroid is best done at 120–250° C. and preferably in the presence of an acidic dehydrating agent such as potassium bisulfate, zinc chloride, p-toluenesulfonic acid or anhydrous copper sulfate. However, if esters of 3-keto-6-hydroxysteroids like the benzoate or furoate are employed, the acidic dehydrating agent may be omitted, simple heating then serving to cause the transformation (IV→X or V→X).

The modes of isolation and purification of the products of this invention are not limited to those specifically described, for there may be used any of the techniques known to the art such as crystallization, distillation, chromatographic adsorption, preparation of derivatives of favorable properties, and the like.

What we claim as our invention is:

1. Process which comprises subjecting to a mild hydrolytic treatment a steroid having at C—3 and C—6 substituents hydrolyzable to hydroxyl, thereby forming a steroid having at C—3 a hydroxyl group and at C—6 a group hydrolyzable to give hydroxyl; oxidizing said steroid to the corresponding 3-keto steroid; and heating the latter with elimination of the group at C—6, thereby forming a 3-keto-Δ⁴-unsaturated steroid.

2. Process which comprises subjecting a 3,6-diacylated steroid to mild hydrolytic treatment and thereby forming a 3-hydroxy-6-acylated steroid; oxidizing the latter to form a 3-keto-6-acylated steroid; and heating the latter with elimination of the group at C—6 in the form of the corresponding acid, thereby forming a 3-keto-Δ⁴-unsaturated steroid.

3. The step which comprises subjecting to a mild hydrolytic treatment a steroid having at C—3 and C—6 groups hydrolyzable to give hydroxyl, thereby forming a steroid having at C—3 a hydroxyl group and at C—6 a group hydrolyzable to hydroxyl.

4. The step which comprises oxidizing a steroid having at C—3 a hydroxyl group and at C—6 a group hydrolyzable to hydroxyl, thereby forming a 3-keto steroid having at C—6 a group hydrolyzable to hydroxyl.

5. Compounds representable by the formula

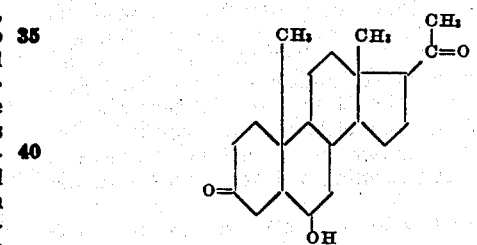

6. Compounds representable by the formula

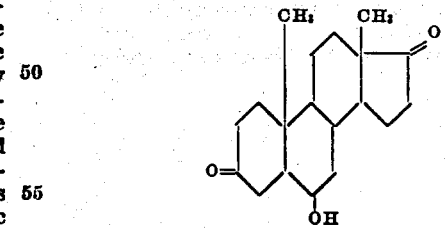

7. Compounds representable by the formula

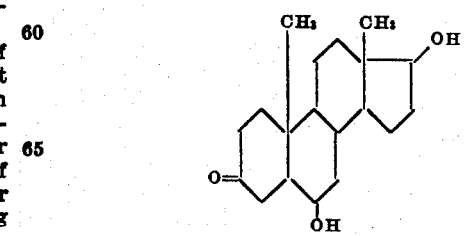

8. Androstanol-6-dione-3,17.
9. Pregnanol-6-dione-3,20.
10. Androstanediol-6,17-one-3.
11. Process according to claim 1, wherein the steroid having at C—3 and C—6 substituents hydrolyzable to hydroxyl is prepared by reacting a 3-hydroxy-6-keto steroid with an agent of the class consisting of acylating agents and etherifying agents, thereby forming a 6-keto-steroid having at C—3 a substituent hydrolyzable to hydroxyl, reducing said 6-keto-steroid with formations of a 6-hydroxy-steroid having at C—3 a substituent hydrolyzable to hydroxyl, and treating said 6-hydroxy-steroid with an acylating agent capable of forming esters intrinsically less hydrolyzable than the group at C—3, thereby forming a steroid having at C—3 and C—6 substituents hydrolyzable to hydroxyl.

12. Process according to claim 1, wherein the steroid having at C—3 and C—6 substituents hydrolyzable to hydroxyl is prepared by reacting a 3,6-dihydroxy-steroid with substantially one equivalent of a member of the class consisting of acylating agents and etherifying agents, thereby forming a steroid having at C—6 a hydroxyl group and at C—3 a group hydrolyzable to hydroxyl, and reacting said steroid with an acylating agent capable of forming esters intrinsically less hydrolyzable than the group at C—3, thereby forming a steroid having at C—3 and C—6 substituents hydrolyzable to hydroxyl.

13. Process according to claim 1, wherein the 3-keto-steroid having at C—6 a group hydrolyzable to hydroxyl, prior to the heat treatment, is hydrolyzed with production of a 3-keto-6-hydroxy-steroid.

14. Process according to claim 1, wherein the heat treatment is accomplished in the presence of an acidic dehydrating agent.

15. Process which comprises subjecting a 3,6-diacylated steroid to mild hydrolytic treatment, thereby forming a 3-hydroxy-6-acylated steroid, oxidizing the latter to form a 3-keto-6-acylated steroid, hydrolyzing the latter with formation of a 3-keto-6-hydroxy-steroid, and heating the latter in the presence of an acidic dehydrating agent, thereby forming a 3-keto-$\Delta^4$-unsaturated steroid.

16. Process which comprises subjecting a 3,6-dihydroxy-steroid to mild treatment with an aralkylating agent, thereby forming a 3-aralkyloxy-6-hydroxy steroid.

17. Process which comprises subjecting a 3,6-dihydroxy steroid to mild treatment with an acylating agent, thereby forming a 3-acyloxy-6-hydroxy-steroid.

18. Process which comprises subjecting a steroid having in rings A and B the structure,

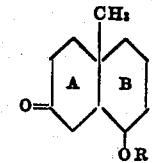

where —OR is a member of the class consisting of —OH and groups hydrolyzable to —OH, to the action of heat, with elimination of HOR, thereby forming a $\Delta^4$-3-keto-steroid.

19. A compound having the formula

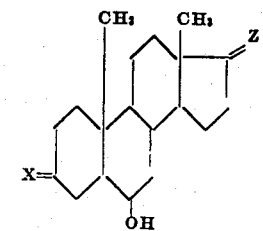

where Z is a member of the class consisting of

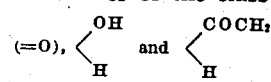

where X is a member of the class consisting of (=O) and groups hydrolyzable to (=O) and OR is a member of the class consisting of —OH and groups hydrolyzable to —OH.

20. A compound having the formula

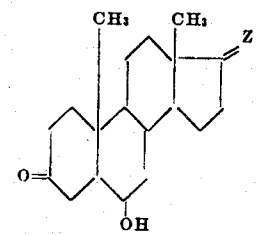

where Z is a member of the group consisting of

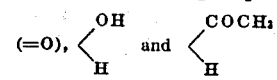

RUSSELL EARL MARKER.
ELMER J. LAWSON.